(12) United States Patent
Jaye

(10) Patent No.: US 6,415,322 B1
(45) Date of Patent: Jul. 2, 2002

(54) DUAL/BLIND IDENTIFICATION

(75) Inventor: Daniel J. Jaye, Andover, MA (US)

(73) Assignee: Engage, Inc., Andover, MA (US)

( * ) Notice: Subject to any disclaimer, the term of this patent is extended or adjusted under 35 U.S.C. 154(b) by 0 days.

(21) Appl. No.: 09/258,779

(22) Filed: Feb. 26, 1999

Related U.S. Application Data

(60) Provisional application No. 60/076,179, filed on Feb. 27, 1998, and provisional application No. 60/076,404, filed on Feb. 27, 1998.

(51) Int. Cl.$^7$ .............................................. G06F 15/16
(52) U.S. Cl. ...................... 709/224; 709/221; 379/127
(58) Field of Search ................................ 709/201, 221, 709/222, 224, 203; 379/127, 114, 19; 707/9; 345/327

(56) References Cited

U.S. PATENT DOCUMENTS

| | | | | |
|---|---|---|---|---|
| 5,245,656 | A | | 9/1993 | Loeb et al. ................... 380/23 |
| 5,754,938 | A | | 5/1998 | Herz et al. ................... 455/4.2 |
| 5,754,939 | A | | 5/1998 | Herz et al. ................... 455/4.2 |
| 5,765,142 | A | * | 6/1998 | Allred ......................... 709/201 |
| 5,809,121 | A | * | 9/1998 | Elliott ......................... 379/127 |
| 5,835,087 | A | | 11/1998 | Herz et al. ................... 345/327 |
| 5,889,799 | A | | 3/1999 | Grossman et al. .......... 379/266 |
| 6,029,195 | A | | 2/2000 | Herz ........................... 709/219 |
| 6,134,549 | A | * | 10/2000 | Regnier ......................... 707/9 |
| 6,208,720 | B1 | * | 3/2001 | Curtis ......................... 379/114 |

FOREIGN PATENT DOCUMENTS

| | | |
|---|---|---|
| WO | WO 97/16796 | 5/1997 |
| WO | WO 97/26792 | 7/1997 |

OTHER PUBLICATIONS

Schreiber, F.A. et al., "Dynamic User Profiles and Flexible Queries in Office Document Retrieval Systems", *Decision Support Systems*, 5:13–28 (1989).

Schrage, "Paul Schaut," Brandweek, Mar. 27, 2000, vol. 41, No. 13, 7 pages.

Mancey, "Dangerous Data," Computer Business Review, Jun. 1999, vol. 7, No. 6, 6 pages.

"Microsoft Press Computer Dictionary," Microsoft Press, 1997, p. 92.

* cited by examiner

*Primary Examiner*—Ayaz Sheikh
*Assistant Examiner*—Khanh Quang Dinh
(74) *Attorney, Agent, or Firm*—Ropes & Gray; Edward J. Kelly

(57) ABSTRACT

A computer apparatus and a method is described for establishing a global interest profile of a user. At least one local server and an enterprise server communicate with the user via a communication channel. The local server assigns a local ID to the user. The enterprise server assigns to the user a global ID and links the local ID and local user information with the global ID to form a global interest profile of the user. The identity of the users is not shared between servers, thereby maintaining the privacy of the user.

50 Claims, 7 Drawing Sheets

DUAL/BLIND IDENTIFICATION

CROSS-REFERENCE TO RELATED APPLICATIONS

This application claims the benefit of U.S. Provisional Applications Nos. 60/076,179 and 60/076,404 having a common filing date of Feb. 27, 1998.

FIELD OF THE INVENTION

The invention relates to systems and methods for monitoring and measuring the interests of a user viewing content on a computer network, in particular on multiple servers in an enterprise network, while protecting the privacy of the user.

BACKGROUND OF THE INVENTION

It is useful for vendors who sell items through the Internet to be able to compile sophisticated marketing data that indicates users' interest in the vendors' Web pages. Interest in a particular page may be determined by counting the number of "hits" on that page (i.e., the number of times the page is accessed) or by combining a count of the number of hits with data indicative of the amount of time users spend viewing the page. The number of hits for a page and the amount of time spent by users viewing a page are both determinable using conventional techniques.

Although measurement of users' interest in each of a vendor's pages is useful, additional useful information may be obtained by correlating these measurements on a per user basis. Thus, a vendor may learn that a first type of user that is interested in page A is also usually interested in page B, while a second type of user that is interested in page C is also usually interested in page D. Such information allows the vendor to customize his Web pages on the fly for each user so that a user that initially selects particular pages is presented with the opportunity to select more of the type of pages in which that user is expected to be interested.

However, in many instances, a user accessing the Internet jumps from server to server. Unless different vendors on different servers agree to cooperate, it is extremely difficult, if not impossible, for a first vendor on a first server to know that a user who accessed a particular one of the first vendor's pages also accessed a particular page of a second vendor on a second server. In addition, there is no built in mechanism on the Internet for globally identifying users so that vendors on different servers can share such information. Also, even in instances where a group of cooperating vendors have adopted a cross-server user identification scheme that globally identifies the users to the vendors, it is questionable whether such schemes violate users' privacy since each of the participating vendors is exchanging information about users that the users might not want to be shared. Moreover, such limited cooperative efforts at cross-server identification generally employs a single identifier for each user. However, cross-server identification schemes that employ a single identifier have disadvantages. For example, should one of the vendors stop collaborating with the others, such as because of an organizational or business change, issues of ownership and access to information tied to a shared identifier can arise.

Accordingly, it is an object of the invention to provide a distributed identification scheme which allows individual servers to control their own local identification scheme and to collaborate with other servers at its manager's discretion to allow a user to access multiple servers in an enterprise network without potentially violating the privacy of the user.

SUMMARY OF THE INVENTION

A distributed user identification process is provided that allow individual local servers or domains to control their own user identification scheme and to collaborate with other local servers or domains at the discretion of an enterprise server. The enterprise server correlates the local user identification scheme with a global user identifier and may disclose to interested outside parties, such as advertisers, only the global user identifier without revealing the identity of a user who interacts with a local server.

Also provided is a process for compiling anonymously a global user profile from local user profiles generated by the local servers.

In general, according to one aspect of the invention, a computer network includes at least one local server and an enterprise server in communication with the local server. The local server establishes a local ID for the user and communicates to the enterprise server the local ID of the user and a local user profile based on user interaction with the local server. The enterprise server links the local ID to a global ID assigned to the user by the enterprise server and records in a database the information about the local user profiles to form the global interest profile of the user.

Preferred embodiments may include one or more of the following features. The global ID may be known only to the enterprise server and may be kept secret from the local servers. User information recorded in the enterprise database may include the local ID of the user. The local user ID assigned by one local server may be hidden from the other local servers. The local user profile may be communicated to the enterprise server at predetermined times and/or when a number of changes made to the local profiles are greater than a predetermined number of changes. The global ID may be assigned to the user directly by the enterprise server when the user first accesses the enterprise server. Alternatively, the global ID may be assigned to the user when the user accesses one of the local servers and the local server communicates the local ID of the user and possibly also a local user profile to the enterprise server. The local ID and the global ID may be persistent and include state information. The state information may be communicated between the user and the local server and the enterprise server with the help of cookies. The local server may communicate the local user ID to the enterprise server by transmitting on an HTML page a URL which may include a graphic symbol of zero width and height, or by temporarily redirecting the URL selected by the user to a local URL. Transmission of the URL may be transparent to the user.

A global interest profile may be established for each user of at least a subset of users and the global interest profiles between different users may be compared. At least one score may be computed for a user and the score of the user may be compared to a corresponding score of another user. The scores may represent an absolute number score. The local user profile may established incrementally by adding information about a most recent user interaction to a legacy user profile stored at the local server. The user profile may be processed in real time and weighted according to the recency of the user interaction with the local server. The global user profile for a plurality of users may be updated in a single pass.

In another aspect of the invention, a computer apparatus for establishing a global interest profile of a user includes at least one local server in communication with the user via a communication channel wherein the local server assigns a local ID for the user during the first access by the user to the local server. An enterprise server communicates with the user and the local server via the communication channel and assigns a global ID for the user. The local server communicates to the enterprise server the local ID of the user and possibly also a local user profile based on user interaction with the local server. The enterprise server links the local ID to the global ID and records in a database information about the local ID and, if desired, also the local user profile to form a global interest profile of the user.

In yet another aspect of the invention, a method monitors interactions between a client and a plurality of servers communicating with one another in a computer network by designating one of the servers as an enterprise server and the remaining servers as local servers. The local server, upon interaction with the client, establishes a local ID for the client and communicating at least the local ID of the client to the enterprise server. When the enterprise server receives from the local server the local ID of the client or when the client interacts directly with the enterprise server, the enterprise server assigns a unique global ID to the client and links the local ID with the global ID.

Preferred embodiments may include one or more of the following features. The enterprise server and the local servers may form an enterprise group. The client may receive state information from the server upon interaction with the server and may transmit the state information during a subsequent interaction with the server. Likewise, the local server may receive from the enterprise server state information related to the client, and may transmit the state information during a subsequent interaction with the enterprise server that relates to the same client. The state information may be persistent and stored in form of a cookie.

In yet another aspect of the invention, a computer program residing on a computer-readable medium includes instructions for causing an enterprise server to establish a unique global ID for a client and link the global ID with a local ID associated with the client on a local server. The program may also form a global interest profile of the client based on local interest profiles compiled by the local server.

BRIEF DESCRIPTION OF THE DRAWINGS

The forgoing and other features and advantages of the present invention will be appreciated more fully from the following further description thereof, with reference to the accompanying drawings wherein.

DETAILED DESCRIPTION OF THE ILLUSTRATED EMBODIMENTS

To provide an overall understanding of the invention, certain illustrative embodiments will now be described. However, it will be understood by one of ordinary skill in the art that the systems described herein can be adapted and modified to provide systems for other suitable applications and that other additions and modifications can be made to the invention without departing from the scope hereof.

Figure 1:
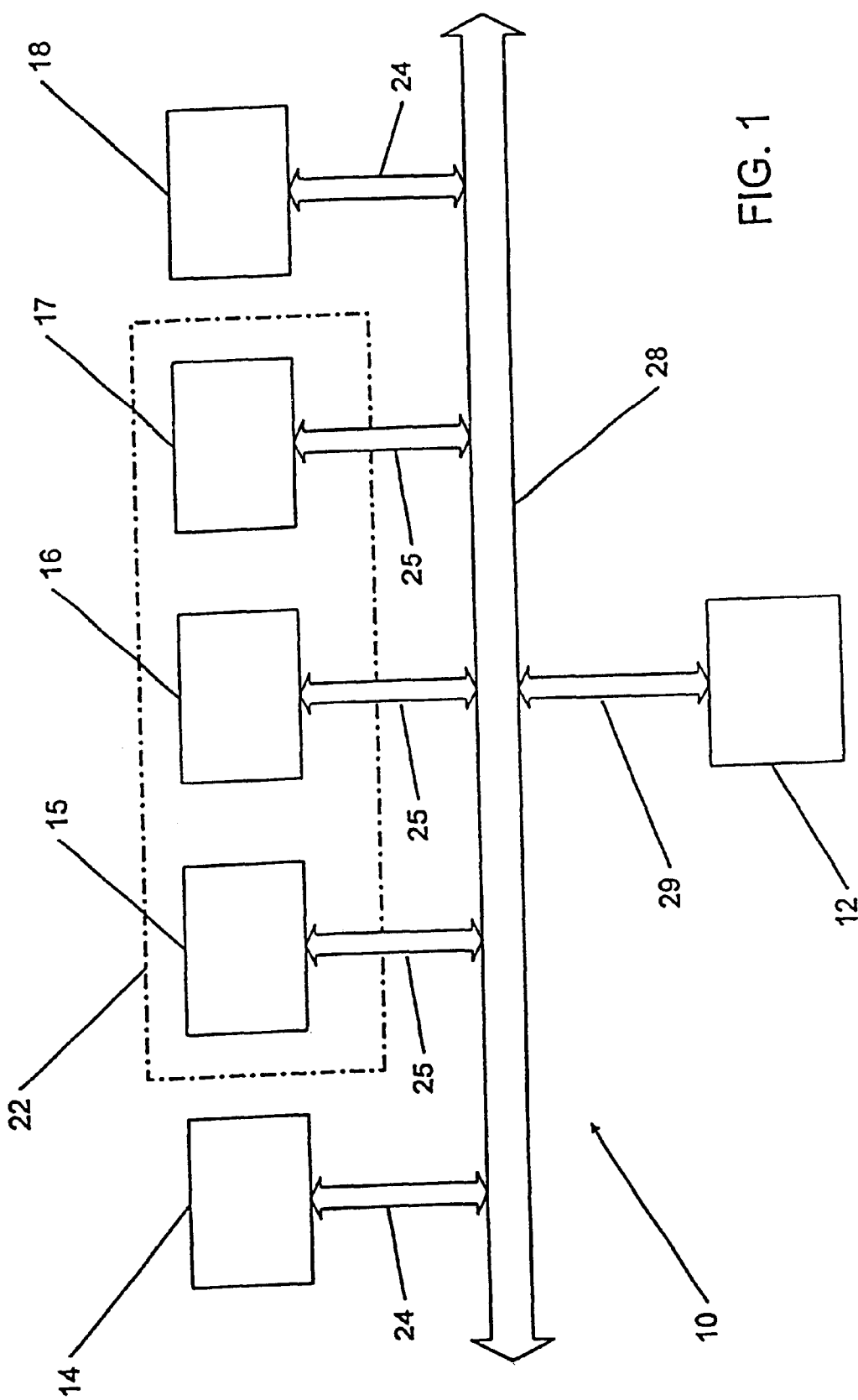
FIG. 1 is a functional block diagram a computer network.
Figure 7:
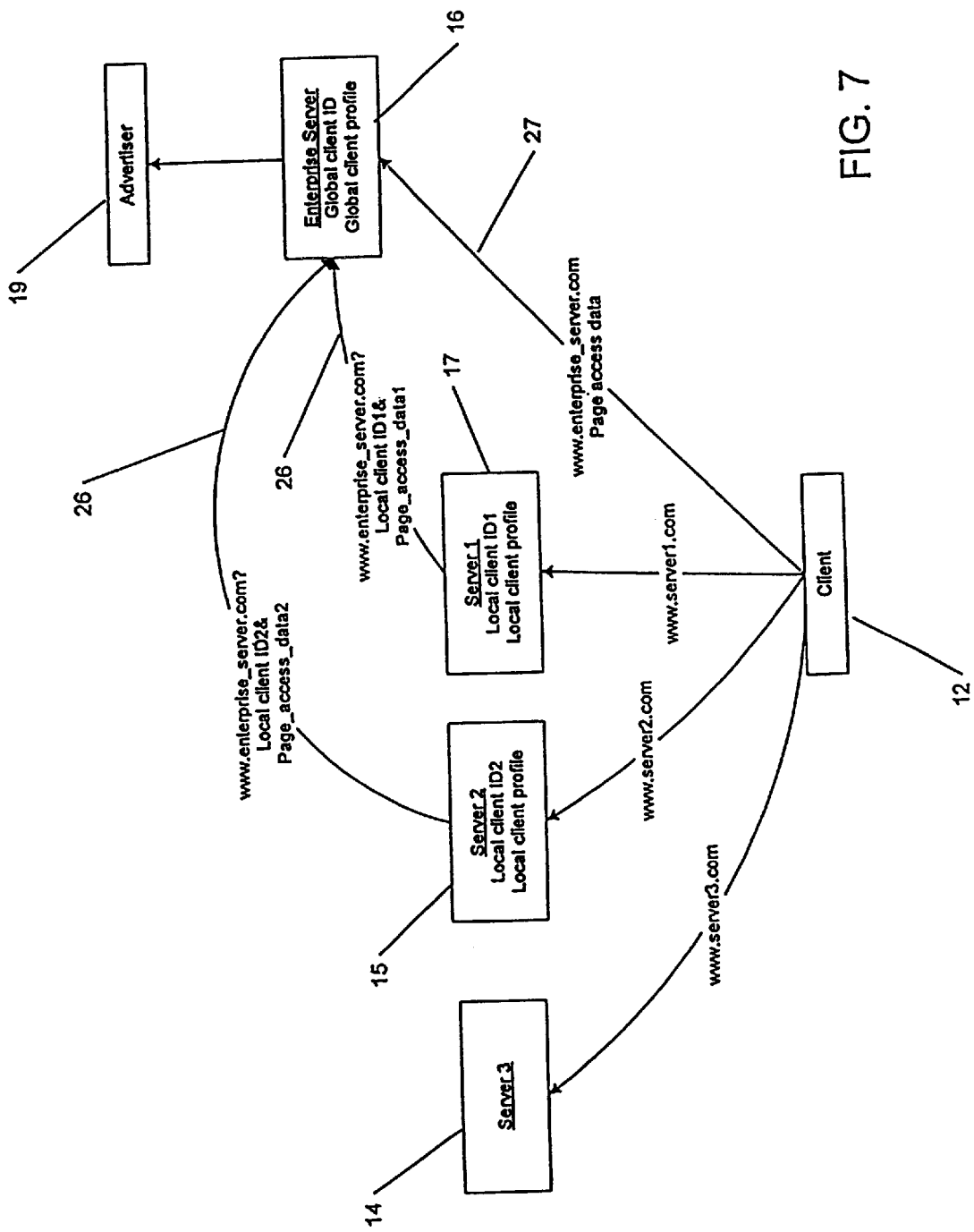
FIG. 7 is a block diagram of client interaction with the servers.

Referring now to FIGS. 1 and 7, a part 10 of the Internet computer network includes a client 12 and a group of servers 14–18. The client 12 may be any one of a variety of conventional, commercially available, hardware and software combinations configured to access Internet servers by any one of a variety of suitable means. Similarly, the servers 14–18 may also be any one of a variety of conventional, commercially available, hardware and software combinations configured to provide conventional Internet services to users. Conventionally, the particular hardware and software combination used by any one of the servers 14–18 is independent of the particular hardware and software combination used by any other one of the servers 14–18. In some instances such as those described below, the conventional server software is supplemented to provide the functionality discussed herein. The servers 14–18 and the client 12 communicate with each other via communication links 24, 25 and 29 which are all connected to a communication channel 28.

For the system described herein, a subset of the servers 15–17 form an enterprise group 22 that monitors and measures users' page usage among all of the local servers 15–17 of the group 22. One of the servers 16 is designated as the "enterprise server" for the group 22 while the other servers 15 and 17 that are part of the group 22 are designated as "local servers". Communication links 26 shown in FIG. 7 between the local servers 15 and 17 and the enterprise server 16 of the enterprise group 22 are not physical communication links, but are intended to illustrate the information exchange, such as information about the users' page usage, between the servers 15 and 17 and the enterprise server 16. The client 12 can also communicate directly with the enterprises server 16, as indicated in FIG. 7 by communication link 27. Communication links 26 and 27 can also be used to exchange state information, as discussed below. In the exemplary embodiment of FIG. 1, the servers 14 and 18 are not part of the enterprise group 22 and therefore do not exchange usage information with the enterprise servers 16. The servers 14 and 18, however, can still be accessed by the client 12.

Note that the term "local" is meant to convey the relationship of the servers 15 and 17 within the enterprise group 22. The local servers 15 and 17 can be accessed by users in the same manner that other conventional Internet servers are generally accessible. The following discussion will be limited to the servers 15–17 which are part of the enterprise group 22.

As indicated in FIG. 7, the client 12 may access any of the servers 15–17 by: (1) establishing a connection to the server, e.g., in an Internet connection, by entering the server's URL (Uniform Resource Locator) address www.server#. com; (2) using the established connection to provide the server with a request for specific data; and (3) receiving the requested data from the server via the connection. The Internet location may also include, e.g., appended to the URL, the server location of the data, the file(s) on the server that contain the data, and the type of the data (i.e., graphic image, HTML page, etc.).

The client 12 requests HTML pages from the servers 15–17 that, when displayed, may include user-actuatable links to other HTML pages. The other HTML pages may be on the same server as the displayed HTML page, or may be on a different server. In many instances, actuating a link to an HTML page causes the user to transfer from one server to another in a manner that is, in many respects, transparent to the user.

The local servers 15 and 17 upload information about users' page accesses to the enterprise server 16. The enterprise server 16 combines the information for each user so that, for example, it is possible to correlate accesses by a particular user of Web pages on the local server 15 with accesses by the same user of Web pages on the local server 17. However, as seen in FIG. 7 and described in more detail below, it is the enterprise server 16, rather than the local servers 15 and 17, that correlates the cross-server information on a per user basis. Each of the local servers 15 and 17 uses a "local" ID for each user that accesses the local servers 15 and 17 directly. The local ID's are different for each of the servers 15 and 17 so that the local servers 15 and 17 are prevented from directly sharing or correlating information about a particular user without assistance from the enterprise server 16.

Since the HTTP protocol is stateless, the servers and any gateway program on the servers retain no knowledge of any previous transaction. Without persistent state information, the server will not be able to identify the client and/or obtain information about the client. Likewise, without state information, the local servers 15 and 17 will not be able to communicate local information about the client to the enterprise server 16. The exemplary system described herein employs cookies to preserve state information. However, any other mechanism that preserves state information can be used.

The features of cookies are described in, for example, *The HTML Sourcebook,* third edition, by Ian S. Graham, published by Wiley & Sons, Inc., 1997. By way of background, cookies represent one possible mechanism for storing state and/or identification information on a user's local server 12. The server accessed by the user sends the cookie information to the user via a conventional command capable of transferring cookie information from the server to the user. Thereafter, whenever the user requests data from the server that set the cookie, the user request also includes the cookie previously sent by the server to the user. The command that sets the cookie causes the cookie information to correctly identify, the server that executes the command. In addition, generally, a cookie is only sent to a server that set the cookie. Thus, if a particular server sets a cookie, the cookie includes information indicating that it was set by the particular server. There are mechanisms in place to prevent that cookie from being sent to any other server.

In the exemplary embodiment, each of the local servers 15 and 17 assign their own unique persistent state information to the client 12 in form of a local ID. The enterprise server 16 assigns a secret persistent state information to the client 12 in form of a "global" ID and correlates the global ID with each of the unique local ID's assigned by each of the local servers 15 and 17. All of the ID's are made persistent using cookies. The local server 15 sets a cookie containing a unique local ID for the client 12 assigned by the local server 15. The client 12 subsequently provides the assigned local ID to the local server 15 each time the client 12 requests data (e.g., an HTML page) from the local server 15. Thus, the local server 15 is provided with a basis for knowing the identity of the client 12 each time the client 12 requests data from the local server 15. Similarly, the local server 17 sets a cookie containing a unique local ID for the client 12 (unrelated to the local ID assigned by the local server 15) that the client 12 subsequently provides to the local server 17 each time the client 12 requests data from the local server 17.

Information regarding the data requests and the associated local ID's are provided by the local servers 15 and 17 to the enterprise server 16. The local servers, however, do not reveal the true identity of the user to the enterprise server 16. The enterprise server 16 can map different local ID's for the same user to the single, secret, global ID. Thus, the enterprise server 16 is in a unique position to correlate cross-server information about users while the local servers 15 and 17 can not directly correlate cross-server information because neither of the local servers 15 and 17 possesses the secret global identifier assigned by the enterprise server 16.

Figure 2:
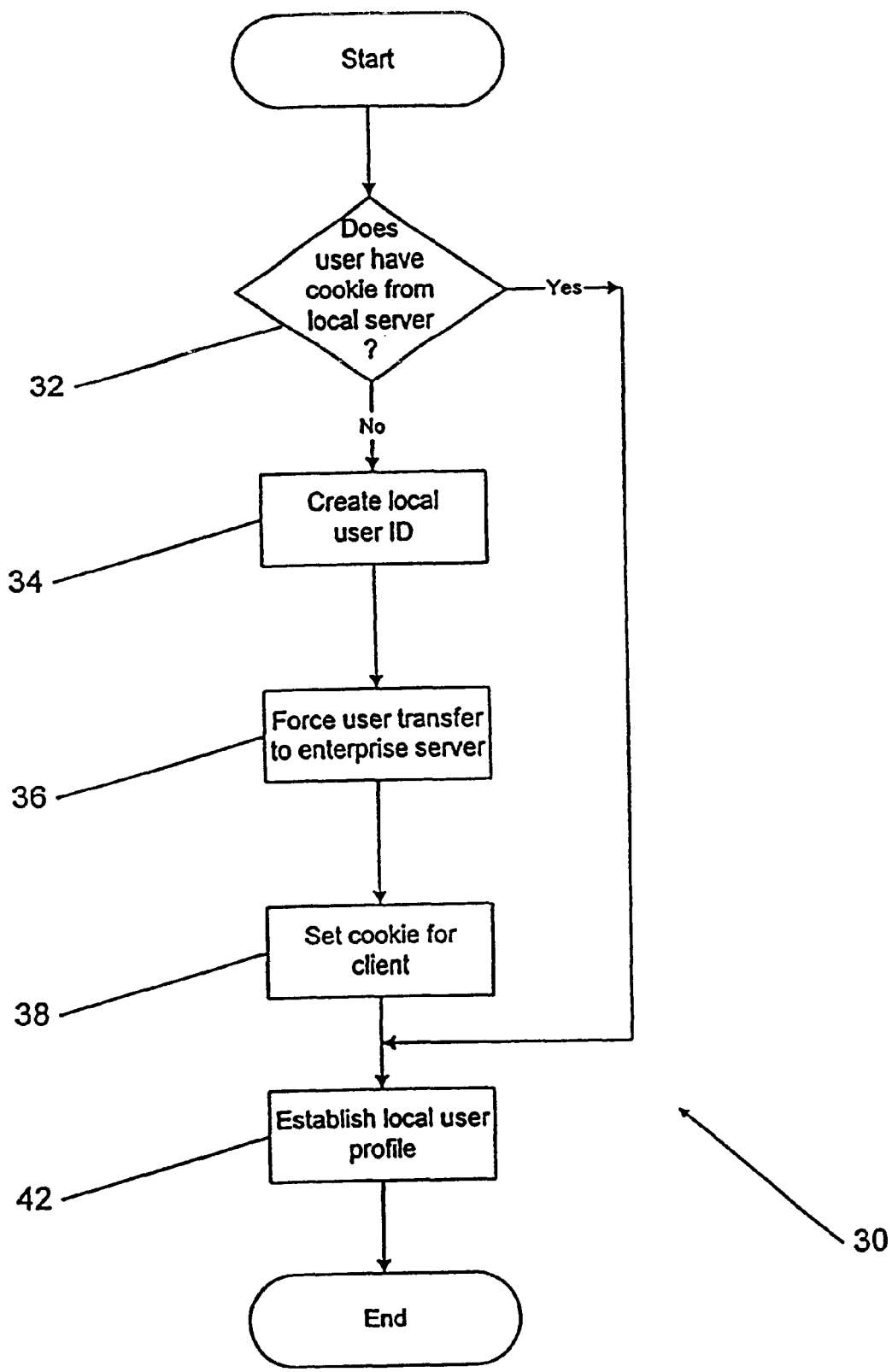
FIG. 2 is a flowchart of a process operating on a local server for establishing a local user profile.

Referring now to FIG. 2, a flow chart 30 illustrates an embodiment of the process of the invention based on software operating on the local servers 15 and 17. The process 30 begins at a test step 32 after a data request has been submitted by the client 12. At the test step 32, it is determined whether the client 12 has ever requested data from the particular local server prior to the current request. Note that, as discussed above, if the client 12 had ever accessed the particular local server, then the client 12 would have a cookie that had been set previously by the particular local server. Thus, if the client 12 does not provide a cookie with the data request, then it is determined at the test step 32 that the client 12 has never accessed the local server and control passes from step 32 to step 34, where the local server creates a unique local ID for the client 12. The local server can generate unique local ID's in a variety of conventional manners familiar to one of ordinary skill in the art, including, but not limited to, incrementing a stored value and then providing an alphanumeric version of that value as the local ID.

Following step 34 is a step 36 where the local server forces a transfer to the enterprise server 16 (i.e., the client is transferred to the enterprise server 16). Generally, a variety of conventional techniques exist for forcing a transfer to another server. For example, the local server may use conventional techniques to insert a special URL into the HTML page requested by the client 12. The special URL points to the enterprise server 16 and calls for insertion of a graphics image have zero width and height. The special URL may also contain additional information, such as information identifying the local server and information indicating the local ID of the user. The additional information may be appended to the end of the URL in the form of http://enterprise_server_id/go?local_server_id&client_information. This process may be transparent to the user.

Alternatively, redirection may be used to transfer the user to the enterprise server. Redirection involves providing an HTTP response message to the browser which forces the browser to look for a different URL. The local server redirects the client 12 to the enterprise server 16 by, for example, returning the location of the enterprise server 16 in the form:

location: server_url comments

Browsers that understand the location field will automatically connect to the URL of the enterprise server 16.

The forced transfer serves to effectively "register" the local ID of the client 12 with the enterprise server 16. As mentioned above, the forced transfer can be transparent to the client 12. Processing at the enterprise server 16 in response to a forced call is described in more detail hereinafter. Note, however, that once the enterprise server 16 has completed the processing, the client 12 is returned to the local server. In the case of using redirection, the enterprise server 16 simply redirects the client 12 back to the local server that the client 12 was accessing prior to being transferred to the enterprise server 16. Following the step 36 is a step 38 where the local server sets a local cookie for the client 12. The steps 34, 36, 38 are executed only once, i.e., the first time the client 12 accesses the local server. After that, the client 12 will send to the local server the cookie set by the respective local server whenever the client 12 accesses the respective local server.

Following the step 38, or following the step 32 if the local server receives a cookie from the client 12, is a step 42 where the local server compiles information based, for example, on frequency and duration of page accesses by the client 12. This information may be compiled by, for example, providing a plug-in to the local server that includes a conventional server API call to the plug-in each time a user requests a page. Thus, for example, the time duration that a user spends viewing page A may be determined by registering the time when a user requests page A, registering the time when the user requests a subsequent page B, and calculating the difference between the two times to determine the duration. Following the step 42, processing is complete for the local server handling the page request of the client 12. As discussed in more detail below, the enterprise server 16, using a secret global ID known only to the enterprise server 16, combines the information provided by the local server with information relating to the same user from other local servers that is mapped to the various local ID's assigned to a user by the different local servers.

For the enterprise server 16 to be able to compile information about the users, it is necessary for the local servers to periodically forward to the enterprise server 16 the gathered information along with the local ID for each user and information identifying the local server. This may be accomplished using any one of a variety of conventional techniques. In a preferred embodiment, the local server formats the information as a plurality of HTML pages that are uploaded to the enterprise server 16 in a conventional manner using conventional HTTP exchange techniques. The local server initiates the transfer either when a local buffer of the local server exceeds a predetermined size, or after a predetermined amount of time has passed since a previous update of the enterprise server 16 by the local server. The predetermined size and the predetermined amount of time are chosen based on a variety of functional factors familiar to one of ordinary skill in the art, including amount of storage available at the local server and hit rate of the local server.

Figure 3:
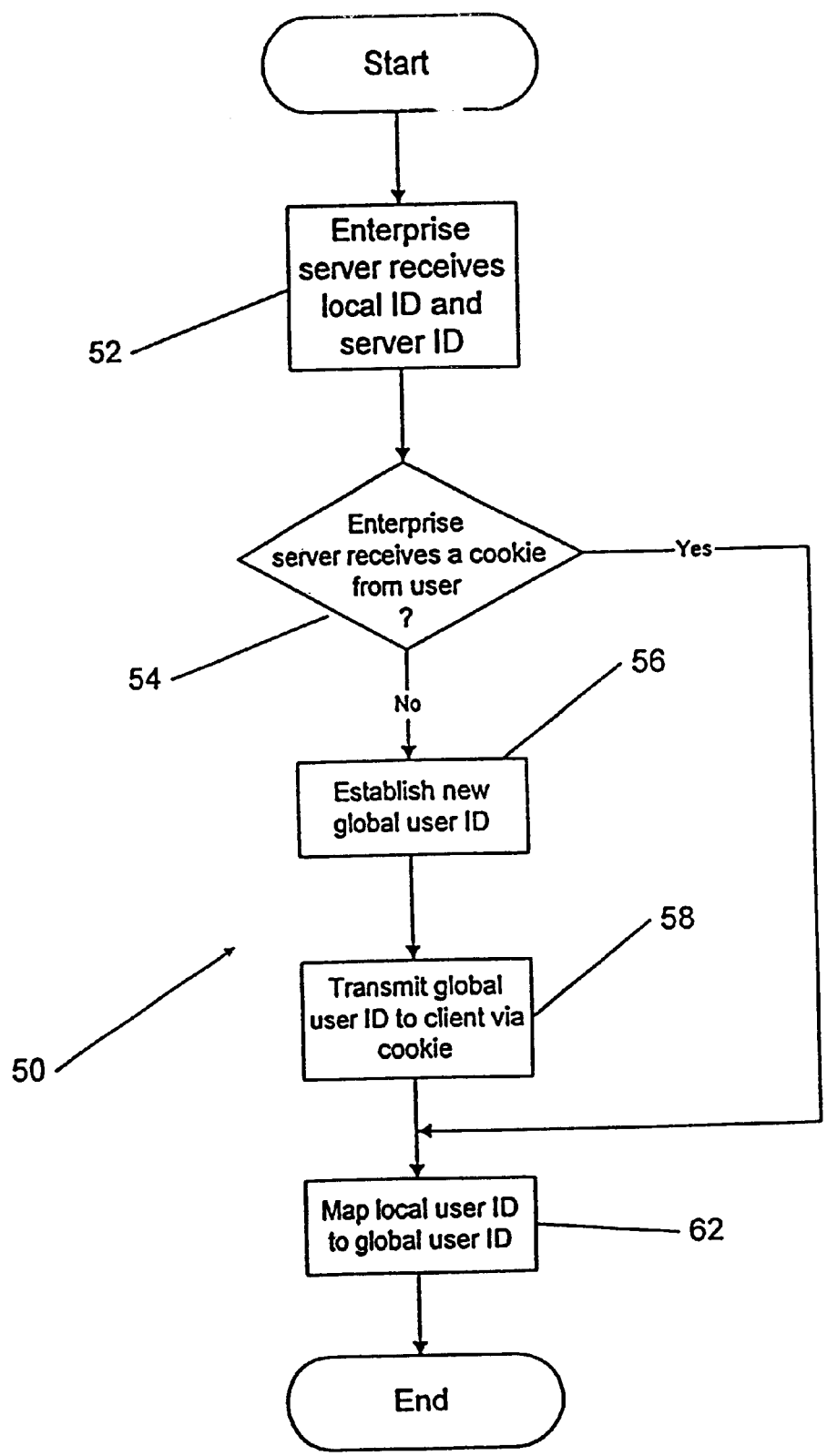
FIG. 3 is a flowchart of a process operating on an enterprise server for linking a local user ID to a global user ID.

Referring now to FIG. 3, a flow chart 50 illustrates steps performed by the enterprise server 16 in response to a forced transfer by a local server, such as that illustrated by the step 36 of FIG. 2. Processing begins at a step 52 where the enterprise server 16 receives the new assigned local ID as well as the server identification from the calling local server. As discussed above, this information may be encoded in the special URL provided by the local server. However, other conventional techniques for conveying this information exist including, but not limited to, passed arguments, environment variables, and cookies passed between the local server and the enterprise server 16.

Following the step 52 is a test step 54 which determines if the client 12 has ever accessed the enterprise server 16 (i.e., the test step 54 determines if the client 12 has ever accessed any of the servers 15–17 of the group 22). This can be determined using cookies where the enterprise server 16 sets a cookie and provides it to the client 12. Thus, if the enterprise server 16 does not receive a cookie from the client 12, then it is determined at the test step 54 that the client 12 has never accessed the enterprise server 16 and control passes from the test step 54 to a step 56 where a new global ID is created for the client 12. Note that the system is designed so that only one global ID is created for each user. Following the step 56 is a step 58 where the global ID is forwarded to the client in the form of a cookie. The global ID may be created in any one of a variety of conventional manners familiar to one of ordinary skill in the art, including, but not limited to, incrementing a stored value and then providing an alphanumeric version of that value as the global ID.

If it is determined at the step 54 that the enterprise server 16 received a cookie from the client 12, then control passes from the test step 54 to a step 62 where the global ID, passed via the cookie, is mapped to the new local ID provided by the local server. Note that the step 62 also follows the steps 56, 58 where the global ID is created and passed to the client 12. The mapping at the step 62 can be performed in a variety of conventional manners, including using an array indexed according to the local server and local ID and containing entries corresponding to the global ID. Alternatively, the mapping may be provided using an appropriate data structure, such as a linked list having nodes indicating the local server, the local ID provided by the local server, and the corresponding global ID. Alternatively still, the mapping may be stored in a database having a plurality of records, each containing the global ID, the local ID, and the site identifier for the local server that assigned the local ID. In this way, a single global ID may be mapped to multiple local ID's assigned by multiple local servers.

Following the step 62, processing is complete for registering the new local ID of the client 12 with the enterprise server 16. After this registration process, the local server does not force a transfer to the enterprise server 16 when the client 12 accesses the local server. Instead, as discussed above, the local server compiles data which is subsequently transferred to the enterprise server 16. It is the enterprise server 16 that combines all of the data from all of the local servers on a per user basis and makes the thus-compiled information available in a way that does not necessarily identify the client 12.

The process illustrated in FIGS. 2 and 3 can be used to build a global user profile that is compiled from user interaction with the local servers 15 and 17 using the local user IDs and possibly also with the enterprise server 16. Typically, the process monitors several characteristics of the user's visit, such as, for example, the subject matter of the visited web pages and the duration of these visits. This collected information can be used to characterize the user's interest in a given interest category and to determine what available content would be of interest to the user. The generated global user profile is administered by the enterprise server 16 and identified by the global ID of the user without necessarily revealing the identity of the client 12.

A user's interest behavior can be tracked over a history of Internet sessions, so that a composite view of the user's interests can be generated. Additionally, the described processes may take into consideration the age of the collected behavior information, so that older behavior information has less impact on an interest score than more recent behavior information. The processes may be sensitive to the duration over which each page is viewed and the generated interests scores are provided in an absolute interest scale, as opposed to a relative interest scale. This facilitates meaningful comparisons of interest levels between different users, and offers a powerful tool for identifying related interests for users having selected demographic characteristics. The processes described herein may also be applied incrementally and reduced to a set of parallel operations to increase greatly the speed of analyzing the collected behavior information. It will be understood that the process may also operate as a stand-alone process on a single web site and, moreover, may not require the use of local and global IDs.

Figure 4:
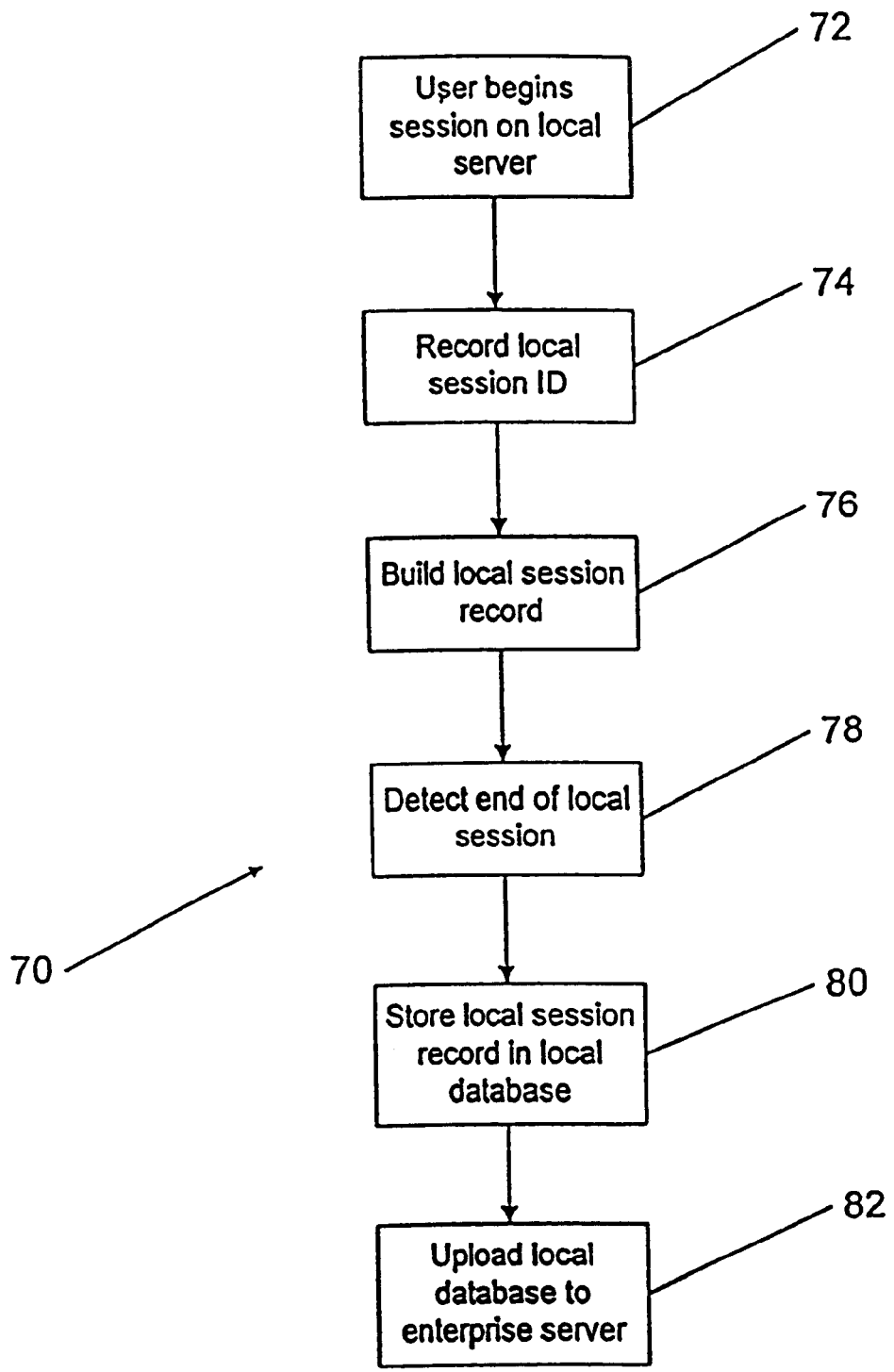
FIG. 4 is a flowchart of a process for building a global user profile on the enterprise server.

The process for building a user profile begins with the step of collecting useful information about the interest behavior of a user 12 looking at different content stored at an exemplary local server 15 (FIG. 1). This data collection step is shown as step 42 in FIG. 2. The process 70 depicted in FIG. 4 starts with step 72, during which the server 15 determines that a session has begun with a particular user 12. As described above, the server 15 can make this determination by identifying a cookie sent from the client 12. If the process 70 finds a cookie then the process 70 determines that the user is known to the server 15 and begins collecting data about the user's session. The process 70 then generates a local session ID which can be a simple signal that identifies one series of related interactions between the user and the server 15. For example, for the first time the user contacts the server 15, the process can set the local session ID to 000001. For subsequent visits, the process can increment the local session ID. The process keeps track of the last local session ID generated to ensure that new local session IDs are generated for each session. Other examples of methods for generating a session IDs are known in the art and any suitable method can be practiced with the process.

Figure 5:
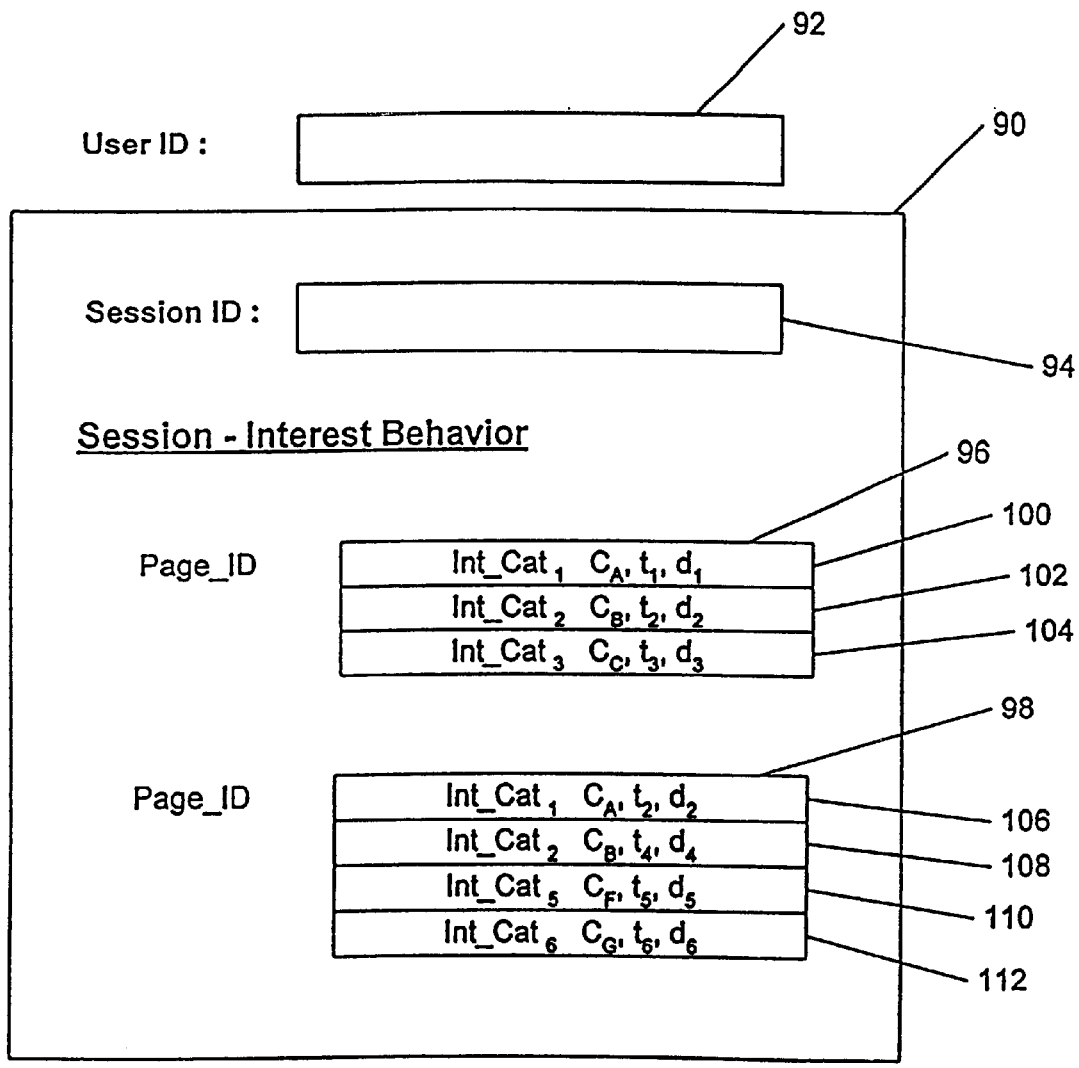
FIG. 5 is an example of a user's session record.

In a subsequent step 76, the process builds a local session record. This is typically done by analyzing the click stream generated by the user as the user looks at the content displayed on the web page or pages located on server 15. An example of one type of session record is shown in FIG. 5. Specifically, FIG. 5 shows a session record 90 that is stored in a database maintained by the server 15. The depicted session record 90 is associated with a local user ID, as the process in this example maintains a record of each of the sessions the user has had with the respective server 15 since information about the user was last uploaded to the enterprise server 16. It will be apparent to one of ordinary skill that FIG. 5 provides an example of a session record, but that other formats can be employed with the process described herein.

FIG. 5 further depicts that each session record can store a list of the web pages viewed by the user while visiting the server 15 and other information about the content of these web pages. Further, for each page viewed, the process can store, for example, information of the type shown in the page block 96, which includes a list of Interest categories, Int_Cat, associated with the page and a list of content interest scores, C, that represents how strongly the content of the viewed page is related to the interest categories; a date time stamp, t, which gives a statement of the time and date on which the page was accessed by the user; and d, a measure of the duration for which the page was viewed by the user. Page block 96 shows that each page can be associated with one or more interest categories, such as Int_Cat1, Int_Cat2, and Int_Cat3, etc. Moreover, a different content interest score can be given for each interest category associated with the page. The process can store a page block for each page viewed during a session. Two page blocks, 96 and 98 appear in FIG. 5, however, any number of page blocks can be stored depending on the number of pages viewed by the user.

Although data collection has been described for a user's activities at one web site, it will be understood that the data collection process 70 can occur on a number of different web sites. This means that one web site dedicated to providing sports information can collect information about the users favorite sports and favorite teams, while another web site that offers books for sale, can collect information about the user's favorite categories of books. Accordingly, a wide range of the user's interests can be captured.

Returning to FIG. 4, the process 70 proceeds from step 76 to step 78 when an "end of session" is detected. This may occur, for example, when the user 12 fails to access a page on the server 15 within a preset time, for example thirty minutes. However, it will be apparent that other techniques for determining the end of session can be used. In step 80, the process 70 stores the session record into a local database of session records. Then, at a selected time, such as once a day, the process 70 in step 82 will upload the contents of the local database of server 15 to a global database of the enterprise server 16. This provides the enterprise server 16 with click stream information representative of the interests of the user 12 during the user's session on server 15. The information can be processed and assembled for generating a global interest profile for that user. As discussed above, the interest information can be combined with the user's demographic, geographic and other suitable information to build a user profile of the user. Likewise, this type of click stream data may also be uploaded from the other server 17 of the enterprise group 22.

Figure 6:
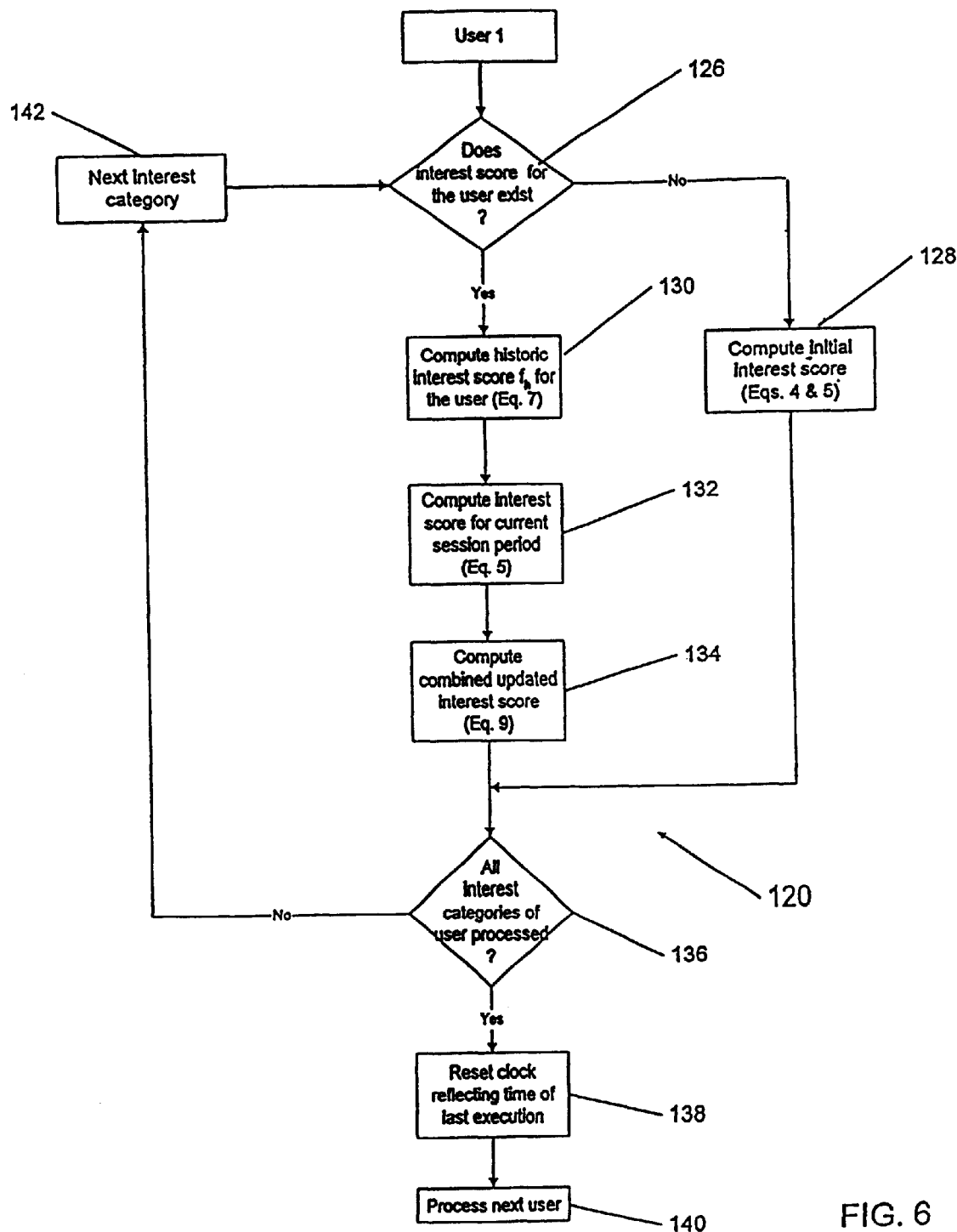
FIG. 6 is a flowchart of a process operating on the enterprise server for creating a multi-user profile.

Referring now to FIG. 6 and Tables 1 and 2, once the information gathered on server 15 reaches the enterprise server 16, an enterprise process 120 running on enterprise server 16 can analyze the information to generate and update interest profiles for the user. Table 1 shows the variables and the pseudo-code of the enterprise process 120; Table 2 lists the equations used in the enterprise process 120 and referenced in FIG. 6. The pseudo-code of Table 1 includes comments that describe the variables appearing in the code.

| Variables | Pseudo-code |
|---|---|
| I :interest behavior vector of four dimensions: (c, t, d, s) for a given interest category | Declare types I, A<br>Define scaling function $f_i()$<br>Define raw interest function $f_r()$ |
| A :array of interest behavior vectors I for a given user | Define historical interest function $f_h()$<br>For each user |
| c :content interest score (range 0.00 to 1.00) | For each category<br>If incremental |
| t :date/time in seconds (since 1/1/96 00:00:00) | then {compute historical interest contribution using $f_h(i_1, t_e)$} |
| d :duration page viewed in seconds (compensated for download time) | Compute r for current period using $f_r(A)$ |
| s :session id | Compute i using $f_i(f_r(A_2) + f_h(i_1, t_e))$ |
| r :raw interest score | Output interest score i |

-continued

| Variables | Pseudo-code |
|---|---|
| i :normalized interest score (range 0.00 to 1.00) | Save $t_c$ as $t_e$ for next execution |
| $t_e$:date/time of prior profiling algorithm execution | |
| $t_c$:current date/time | |
| β :duration coefficient parameter | |
| γ :age coefficient parameter (half life of interest score in seconds) | |
| K :exponential decay constant | |

The functions referenced above are set forth below in equations 1 through 9:

TABLE 2

1. $f_A(A) = i$

2. $f_i(x) = y = 1 - \dfrac{1}{1+x}$

3. $f_i^{-1}(y) = x = \begin{cases} y < 1 & \dfrac{1}{1-y} - 1 \\ y = 1: & 200 \end{cases}$ 4. $i = f_i(f_r(A)) = 1 - \dfrac{1}{1 + f_r(A)}$ 5. $r = f_r(A) = \sum_A \left( f_i \left( \sum_s f_i(\beta d)c \right) e^{-\left(\frac{\ln(2)}{\gamma}(t_c - t)\right)} \right)$ $= \sum_A \left( f_i \left( \sum_s f_i(\beta d)c \right) (2)^{\frac{(t-t_c)}{\gamma}} \right)$ $= (2)^{-\frac{t_c}{\gamma}} \sum_A \left( f_i \left( \sum_s f_i(\beta d)c \right) (2)^{\frac{t}{\gamma}} \right)$ 6. $A = A_1 \cup A_2$ 7. $f_h(i_1, t_c) = f_i^{-1}(i_1)(2)^{\frac{(t_e - t_c)}{\gamma}}$ 8. $r = f_r(A) = f_r(A_2) + f_h(i_1, t_c)$ $= f_r(A_2) + f_i^{-1}(i_1)(2)^{\frac{(t_e - t_c)}{\gamma}}$ 9. $f_A(A) = i = f_i(f_r(A)) = f_i(f_r(A_2) + f_h(i_1, t_c))$ The pseudo-code listed in Table 1 can process information, in particular click stream data, collected about a plurality of users 12 having visited a plurality of web pages located on servers 15, 16, 17. In the enterprise process listed in Table 1, the process generates for each user 12 an array, A, of interest behavior vectors, I, wherein each behavior vector is associated with a given interest category. Each of the vectors I can be a multi-dimensional vector, such as the four dimensional vector (c, t, d, s), wherein c, t, d and s are the parameters provided by the click stream data generated at a web site for a given user. As discussed with reference to FIG. 5, c is representative of the content interest score for a page stored at the server; t is representative of the date/time expressed in seconds, when the page was last viewed by the user, measured from a reference date/time, e.g., Jan. 1, 1996; d is representative of the duration of time for which the page was viewed and is typically provided in units of seconds; and s is representative of a session ID, which identifies interactive sessions of the user with the page, as expressed in Equation 5.

Referring back to FIG. 6, the enterprise process 120 operates on an interest category-by-interest category and a user-by-user basis and, to that end, transitions a loop 122 that selects interest categories one at a time and begins to determine the user's interest profile for that interest category.

Once an interest category is selected for a specific user, e.g. "User 1" of FIG. 6, a first step 126 determines if there has been a previously determined interest score, i, for the selected interest category. If no such historical score exists for the interest category of the user, then the process 120 will compute in step 128 an initial interest score for the selected category I.

The initial interest score may be computed, for example, from information c, d, t, and s, provided by the click stream data. Equation 5 provides one technique for processing the click stream data.

Equation 5 is applied in step 128 to compute a raw interest score r by summing over all sessions s, taking into consideration the content interest score c, a duration coefficient parameter β, and the duration d during which the selected category of content was displayed to the user during one session. The duration coefficient parameter β relates to the time of observation versus the time of the computation. β increases when less computation takes place during the observation. Equation 5 also applies a scaling function, $f_i$, defined in Equation 2 that scales, or normalizes, certain values in Equation 5, such as βd, to a number between zero and one. Finally, Equation 5 also sums and normalizes the user's interest over all observed sessions and multiplies the session record with an exponential function which takes into consideration the relevance of older data. The yield of Equation 5 is a measure of the user's raw interest in a selected category.

If it is determined in step 126 that an interest score already exists for the specified user, then the process 120 goes to step 130 to determine the extent to which the previously determined historical interest score should effect the new interest score. In one practice, this historical contribution $i_1$ is determined from Equation 7. As seen from Equation 7, the historical interest score i is multiplied by the inverse interest scaling function $f_i^{-1}$ to remove the effect of the previously applied scaling process and to remove the effect of the exponential time decay function of Equation 5 applied during the previous session. After the interest profile for the current sessions is determined using Equation 5, step 132, the historical contribution i, determined in step 130 and the current raw interest score determined in step 132 are added (Equation 8) and normalized (Equation 9) to form a combined updated interest score i, step 134.

The new interest score can be stored for the user and the process will move to another interest category for the user, steps 136 and 142. Once the information for all requested interest categories for the users has been processed, the time of last execution, $t_e$, is updated to the current time, $t_c$, and saved, step 138. The process can then be repeated for another user, step 140.

As discussed above, each of the interest behavior vectors, I, can be associated with a given interest category. An interest category can be any subject, topic, concrete or abstract concept, e.g. sports, music, politics, general news or history. One or more categories can be associated with a page stored at a server site and made available to a user. In practice, each page stored at a site can be manually, or automatically assigned a given category or a plurality of given categories each of which is associated with a page. For example an HTML page stored at a server can contain information about a movie describing the Civil War. In this example, this page can be associated with an interest category related to movies, as well as an interest category related to history, or the Civil War. The content interest score can be normalized so as to range in value between 0.00 and 1.00. The process 120 can also be used to assign a score to a page. Accordingly, a page associated with the interest category can also be associated a content interest score that represents how closely associated the selected page is for a particular category or categories.

In another practice, the user profile generated by the systems described herein can also include demographic or geographic information which is collected through conventional means, typically a form the user fills out when visiting the web site. The user profile comprises both demographic information and interest behavior information. It will be understood that the combination of these two types of data can allow for certain types of analysis such as the interest levels of certain demographic groups in certain subject matter to provide detailed market analysis and to identify link interest between seemingly disparate subject matters. Other advantages of the systems processes described herein will be apparent to those of ordinary skill in the art.

As seen from FIG. 6, the enterprise process 120 described above generates a user profile and/or updates an existing user profile for a specified interest category in a single pass. The user profile can be incremented in real time and new interest categories can be easily added. Moreover, the interest measures can be provided as absolute scores, allowing comparisons between the interest scores of different users. Additionally, the information is provided in a human readable form that allows ready access to the data derived from a user's interest behavior.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While the invention has been disclosed in connection with the preferred embodiments shown and described in detail, various modifications and improvements thereon will become readily apparent to those skilled in the art. The local user ID may, for example, be based in user input, such as a membership ID assigned by an organization, or may be selected by the user on a form submitted to the server upon login. The enterprise server may parse the global user profile and release to an interested party, such as an advertiser, only those portions that are of interest to the advertiser and/or to which the advertiser subscribes. Accordingly, the spirit and scope of the present invention is to be limited only by the following claims.

I claim:

1. In a computer network comprising at least one local server and an enterprise server in conmunication with the local server, a method for establishing a global interest profile of a user comprising:

at the local server:
establishing a local ID for the user; and
communicating to the enterprise server the local ID of the user and a local user profile based on user interaction with the local server; at the enterprise server:
linking the local ID to a global ID assigned to the user by the enterprise server;
recording in an enterprise database under the global user ID information about local user profiles relating to the same user and generated from different local servers to form a global interest profile for each user within a subset of users in communication with one or more local servers; and
computing at least one score from the global interest profile of a user for comparing the at least one score with a score of another user.

2. The method of claim 1, wherein the information recorded in the enterprise database includes the local ID of the user.

3. The method of claim 1, wherein the global ID is kept secret from the local servers.

4. The method of claim 1, wherein the local user profile comprises demographic information supplied by the user.

5. The method of claim 1, wherein the local user profile is communicated to the enterprise server at predetermined times.

6. The method of claim 1, wherein changes in the local user profile as a result of recent user interaction are determined and wherein the local user profile is communicated to the enterprise server when the determined changes are greater than a predetermined number of changes.

7. The method of claim 1, wherein the global ID is assigned to the user when the user directly accesses the enterprise server.

8. The method of claim 1, wherein the global ID is assigned to the user when the local server first communicates the local ID of the user to the enterprise server.

9. The method of claim 1, wherein at least one of the local servers and the enterprise server sends state information to the client.

10. The method of claim 1, wherein the enterprise server sends state information to the local server.

11. The method of claim 1, wherein the enterprise server maps the local user ID from the local server to the global user ID.

12. The method of claim 1, wherein the local server communicates the local user ID to the enterprise server by transmitting a URL on an HTML page.

13. The method of claim 12, wherein transmission of the URL is transparent to the user.

14. The method of claim 12, wherein the URL includes a graphic symbol of zero width and height.

15. The method of claim 1, wherein the local server communicates the local user ID to the enterprise server by temporarily redirecting the URL selected by the user to a local URL.

16. The method of claim 1, wherein the local ID of the user is known only to the local server which assigned the local ID.

17. The method of claim 16, wherein the scores represent an absolute number score.

18. The method of claim 1, wherein the local ID and the global ID are persistent.

19. The method of claim 1, wherein the local user profile is established incrementally by adding information about a most recent user interaction to a legacy user profile stored at the local server.

20. The method of claim 1, wherein the local user profile is processed in real time.

21. The method of claim 19, wherein the user profile is weighted according to the recency of the user interaction with the local server.

22. The method of claim 1, wherein the global user profile is updated in real time.

23. The method of claim 1, wherein the global user profile for a plurality of users is updated in a single pass.

24. A computer apparatus for establishing a global interest profile of a user comprising:
   at least one local server in communication with the user via communication channel, the local server assigning a local ID for the user during the first access by the use to the local server;
   an enterprise server in communication with the user and the local server via the communication channel, the enterprise server assigning a global ID for the user;
   wherein the local server communicates to the enterprise server the local ID of the user and a local user profile based on user interaction with the local server; and
   wherein the enterprise server:
      links the local ID to the global ID;
      records in an enterprise database under the global ID information about the local ID and local user profiles relating to the same user and generated from different local servers to form a global interest profile for each user within a subset of users in communication with one or more local servers; and
      computes at least one score from the global interest profile of a user for comparing the at least one score with a score of another user.

25. The apparatus of claim 24, wherein the enterprise server assigns the global ID when the user directly accesses the enterprise server.

26. The apparatus of claim 24, wherein the enterprise server assigns the global ID when the local server communicates to the enterprise server the local ID of a user.

27. The apparatus of claim 24, wherein the local ID and the enterprise ID are persistent.

28. A method for monitoring interactions between a client and a plurality of servers communicating with one another in a computer network, comprising:
   designating one server of the plurality of servers as an enterprise server and the remaining servers as local servers;
   a local server, upon interaction with the client, establishing a local ID for the client and communicating at least the local ID of the client to the enterprise server;
   the enterprise server assigning a unique global ID to the client upon at least one of:
      (i) receiving from the local server the local ID of the client, and
      (ii) the client interacting directly with the enterprise server; and the enterprise server:
         (i) linking the local ID with the global ID;
         (ii) storing the client interactions in an enterprise database under the global ID, thereby allowing the enterprise server to store the client interactions by the same client with different servers in the enterprise database under the global ID; and
         (iii) computing at least one score from the stored interactions of a client for comparing the at least one score with the score of another client.

29. The method of claim 28, wherein the enterprise server and the local servers form an enterprise group.

30. The method of claim 28, wherein the global ID is restricted to the enterprise server.

31. The method of claim 28, wherein the client receives state information from the server upon interaction with the server and transmits the state information during a subsequent interaction with the server.

32. The method of claim 28, wherein the local server receives from the enterprise server state information related to the client, and transmits the state information during a subsequent interaction with the enterprise server that relates to the same client.

33. The method of claim 31, wherein the state information is persistent and stored in form of a cookie.

34. The method of claim 32, wherein the state information is persistent and stored in form of a cookie.

35. The method of claim 28, wherein the local server communicates the local user ID to the enterprise server by transmitting a URL.

36. A computer program, residing on a computer-readable medium, comprising instructions for causing an enter server to:
   establish a unique global ID for a client upon at least one of:
      (i) receiving from a local server a local ID of the client, and
      (ii) the client interacting directly with the enterprise server; and
   link the global ID with the local ID and with local information associated with the local ID to form a global interest profile representative of information generated from interactions between the client and a plurality of local servers for each client within a subset of clients in communication with one or more local servers; and
   compute at least one score from the global interest profile of a client for comparing the at least one score with a score of another client.

37. A method implemented in a computer program application operating on an enterprise server, the enterprise server communicating with a client and at least one local server, the method causing the enterprise server to:

assign to the client a global ID upon at least one of:
  (i) receiving from the local server a local ID of the client; and
  (ii) the client interacting directly with the enterprise server;

link the global ID of the client with the local ID of the client;

record in a database the global ID, the linked local ID and local information about the client associated with the local ID to form a global interest profile representative of information generated from interactions between the client and a plurality of local servers for each client within a subset of clients in communication with one or more local servers; and compute at least one score from the global interest profile of a client for comparing the at least one score with a score of another client.

38. The method of claim 1, wherein the local user profile reflects subject matter selected by a user while interacting with the local server.

39. The apparatus of claim 24, wherein the local user profile reflects subject mater selected by a user while interacting with the local server.

40. The method of claim 28, wherein the client interactions reflect subject matter selected from the client while interacting with a local server.

41. The computer program of claim 36, wherein local information associated with the local ID of a client reflects subject mater selected from the client while interacting with a local server.

42. The method of claim 37, wherein the local information about the client reflects subject matter selected from the client while interacting with a local server.

43. The apparatus of claim 24, wherein the local server communicates the local user ID to the enterprise server by transmitting a URL on an HTML page.

44. The apparatus of claim 43, wherein transmission of the URL is rent to the user.

45. The method of claim 28, wherein the local server communicates the local ID of the client to the enterprise server by transmitting a UR on an HTML page.

46. The method of claim 45, wherein transmission of the URL is transparent to the client.

47. The computer program of claim 36, further including instructions for causing the local server to communicate the local ID of the client to the enterprise server by transmitting a URL on an HTML page.

48. The computer program of claim 47, wherein transmission of the URL is transparent to the user.

49. The method of claim 37, the local server communicates the local ID of the client to the enterprise server by transmitting a URL on an HTML page.

50. The method of claim 49, wherein transmission of the URL is transparent to the client.

\* \* \* \* \*